United States Patent
Hart et al.

(10) Patent No.: US 9,043,247 B1
(45) Date of Patent: May 26, 2015

(54) SYSTEMS AND METHODS FOR CLASSIFYING DOCUMENTS FOR DATA LOSS PREVENTION

(75) Inventors: Michael Hart, Mountain View, CA (US); Kushal Tayal, Stanford, CA (US); Phillip DiCorpo, San Francisco, CA (US)

(73) Assignee: Symantec Corporation, Mountain View, CA (US)

(*) Notice: Subject to any disclaimer, the term of this patent is extended or adjusted under 35 U.S.C. 154(b) by 330 days.

(21) Appl. No.: 13/405,293

(22) Filed: Feb. 25, 2012

(51) Int. Cl.
*G06F 15/18* (2006.01)
*G06F 17/30* (2006.01)
*G06N 5/02* (2006.01)

(52) U.S. Cl.
CPC ............... *G06F 15/18* (2013.01); *G06F 17/30* (2013.01); *G06N 5/02* (2013.01)

(58) Field of Classification Search
None
See application file for complete search history.

(56) References Cited

U.S. PATENT DOCUMENTS

| | | | | |
|---|---|---|---|---|
| 2007/0294199 | A1* | 12/2007 | Nelken et al. | 706/50 |
| 2008/0208840 | A1* | 8/2008 | Zhang et al. | 707/5 |
| 2010/0011000 | A1* | 1/2010 | Chakra et al. | 707/9 |
| 2010/0024037 | A1* | 1/2010 | Grzymala-Busse et al. | 726/26 |
| 2011/0004573 | A1* | 1/2011 | Chitiveli et al. | 706/12 |

OTHER PUBLICATIONS

"Latent Dirichlet allocation", http://en.wikipedia.org/wiki/Latent_Dirichlet_allocation, as accessed Oct. 26, 2011, Wikipedia, (Sep. 13, 2006).

* cited by examiner

*Primary Examiner* — Kakali Chaki
*Assistant Examiner* — Eric Nilsson
(74) *Attorney, Agent, or Firm* — ALG Intellectual Property, LLC (57) ABSTRACT

A computer-implemented method for classifying documents for data loss prevention may include 1) identifying training documents for a machine learning classifier configured for data loss prevention, 2) performing a semantic analysis on training documents to identify topics within the set training documents, 3) applying a similarity metric to the topics to identify at least one unrelated topic with a similarity to the other topics within the plurality of topics, as determined by the similarity metric, that falls below a similarity threshold, 4) identifying, based on the semantic analysis, at least one irrelevant training document within the set of training documents in which a predominance of the unrelated topic is above a predominance threshold, and 5) excluding the irrelevant training document from the set of training documents based on the predominance of the unrelated topic within the irrelevant training document. Various other methods, systems, and computer-readable media are also disclosed.

20 Claims, 7 Drawing Sheets

SYSTEMS AND METHODS FOR CLASSIFYING DOCUMENTS FOR DATA LOSS PREVENTION

BACKGROUND

In the electronic information age, people may share, access, and disseminate high volumes of information. The ease with which information may be disseminated electronically is empowering. At the same time, the workforce has become increasingly mobile, and the ubiquity of high-speed Internet access, smart mobile devices, and portable storage means that "the office" may be anywhere. As a consequence, it has become more difficult than ever for organizations to prevent the loss of sensitive data. Organizations are, therefore, increasingly looking to data-loss prevention ("DLP") solutions to protect their sensitive data.

Traditional DLP systems may employ a variety of heuristics and/or formulas and intercept data at a variety of points in a computing system in the effort to detect and regulate the flow and access of sensitive data. Unfortunately, some approaches may be computationally intensive, potentially consuming valuable computing resources and/or adding latency to the end-user experience. Furthermore, various approaches may yield an unacceptable rate of false positives or false negatives. Accordingly, the instant disclosure identifies and addresses a need for additional and improved systems and methods for classifying documents for data loss prevention.

SUMMARY

As will be described in greater detail below, the instant disclosure generally relates to systems and methods for classifying documents for data loss prevention by performing semantic analyses (e.g., a latent Dirichlet) on prospective training sets of sensitive documents to exclude irrelevant documents from the prospective training sets before training machine learning classifiers with the prospective training sets. In one example, a computer-implemented method for classifying documents for data loss prevention may include 1) identifying a set of prospective training documents for a machine learning classifier that is configured to provide input for data loss prevention determinations, 2) performing a semantic analysis on the set of prospective training documents to identify a plurality of topics within the set of prospective training documents, 3) applying a similarity metric to the plurality of topics to identify at least one unrelated topic within the plurality of topics with a similarity to the other topics within the plurality of topics, as determined by the similarity metric, that falls below a predetermined similarity threshold, 4) identifying, based at least in part on the semantic analysis, at least one irrelevant prospective training document within the set of prospective training documents in which a predominance of the unrelated topic is above a predetermined predominance threshold, and 5) excluding the irrelevant prospective training document from the set of prospective training documents based at least in part on the predominance of the unrelated topic within the irrelevant prospective training document.

In some examples, the semantic analysis may include a latent Dirichlet allocation applied to the set of prospective training documents. In one embodiment, identifying the unrelated topic may include identifying a list of most common terms for each topic within the set of topics. In this embodiment, the similarity metric may include a number of overlapping terms between lists of most common terms for respective topics within the set of topics.

In one example, excluding the irrelevant prospective training document may include 1) presenting the irrelevant prospective training document to a user and 2) receiving input from the user to exclude the irrelevant prospective training document from the set of prospective training documents. In this example, identifying the irrelevant prospective training document may include identifying a subset of prospective training documents within the set of prospective training documents in each of which a corresponding predominance of the unrelated topic is above the predetermined predominance threshold. Additionally, in this example, presenting the irrelevant prospective training document to the user may include selecting the irrelevant prospective training document as representative of the subset of prospective training documents based at least in part on a representativeness metric applied to the irrelevant prospective training document.

In some embodiments, the computer-implemented method may additionally include adding a fingerprint of the irrelevant prospective training document to a list of potentially sensitive documents for data loss prevention determinations. Additionally or alternatively, the computer-implemented method may include performing a keyword extraction on the irrelevant prospective training document for use in data loss prevention determinations.

In some examples, the computer-implemented method may also include 1) applying the similarity metric to identify an additional unrelated topic within the plurality of topics, 2) identifying an additional irrelevant prospective training document based at least in part on the additional unrelated topic, and 3) excluding the additional irrelevant prospective training document from the set of prospective training documents.

In one example, the computer-implemented method may also include, after excluding the irrelevant prospective training document from the set of prospective training documents, training the machine learning classifier with the set of prospective training documents. In this example, the computer-implemented method may additionally include 1) performing a data loss prevention analysis on a sensitive document based at least in part on the machine learning classifier and 2) performing a data loss prevention action on the sensitive document based on the data loss prevention analysis.

In one embodiment, a system for implementing the above-described method may include 1) an identification module programmed to identify a set of prospective training documents for a machine learning classifier that is configured to provide input for data loss prevention determinations, 2) an analysis module programmed to perform a semantic analysis on the set of prospective training documents to identify a plurality of topics within the set of prospective training documents, 3) a similarity module programmed to apply a similarity metric to the plurality of topics to identify at least one unrelated topic within the plurality of topics with a similarity to the other topics within the plurality of topics, as determined by the similarity metric, that falls below a predetermined similarity threshold, 4) a predominance module programmed to identify, based at least in part on the semantic analysis, at least one irrelevant prospective training document within the set of prospective training documents in which a predominance of the unrelated topic is above a predetermined predominance threshold, and 5) an exclusion module programmed to exclude the irrelevant prospective training document from the set of prospective training documents based at least in part on the predominance of the unrelated topic within the irrelevant prospective training document. The system may also include at least one processor configured to execute the identification module, the analysis module, the similarity module, the predominance module, and the exclusion module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a set of prospective training documents for a machine learning classifier that is configured to provide input for data loss prevention determinations, 2) perform a semantic analysis on the set of prospective training documents to identify a plurality of topics within the set of prospective training documents, 3) apply a similarity metric to the plurality of topics to identify at least one unrelated topic within the plurality of topics with a similarity to the other topics within the plurality of topics, as determined by the similarity metric, that falls below a predetermined similarity threshold, 4) identify, based at least in part on the semantic analysis, at least one irrelevant prospective training document within the set of prospective training documents in which a predominance of the unrelated topic is above a predetermined predominance threshold, and 5) exclude the irrelevant prospective training document from the set of prospective training documents based at least in part on the predominance of the unrelated topic within the irrelevant prospective training document.

As will be explained in greater detail below, by performing semantic analyses (e.g., a latent Dirichlet allocation) on prospective training sets of sensitive documents to exclude irrelevant documents from the prospective training sets before training machine learning classifiers with the prospective training sets, the systems and methods described herein may facilitate efficient and accurate data loss prevention via machine learning classification. Additionally, in some examples, by presenting representative documents of apparently irrelevant documents to an administrator, these systems and methods may further ensure the quality of input to machine learning classifiers, thereby potentially reducing false negatives and/or false positives in data loss prevention determinations.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
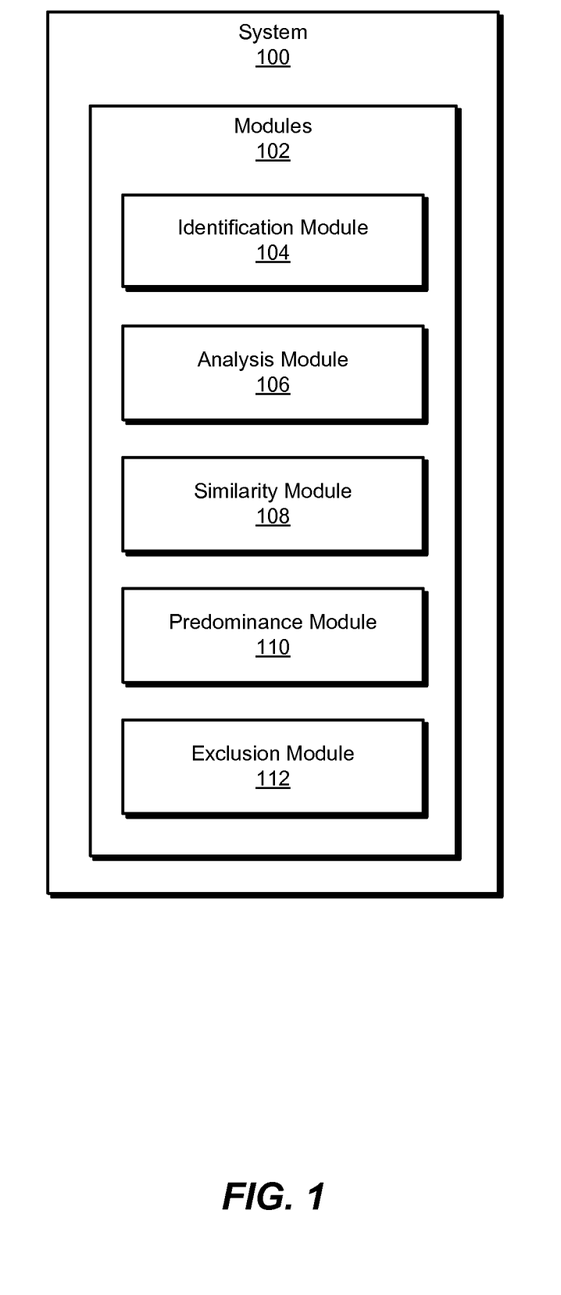
FIG. 1 is a block diagram of an exemplary system for classifying documents for data loss prevention.
Figure 2:
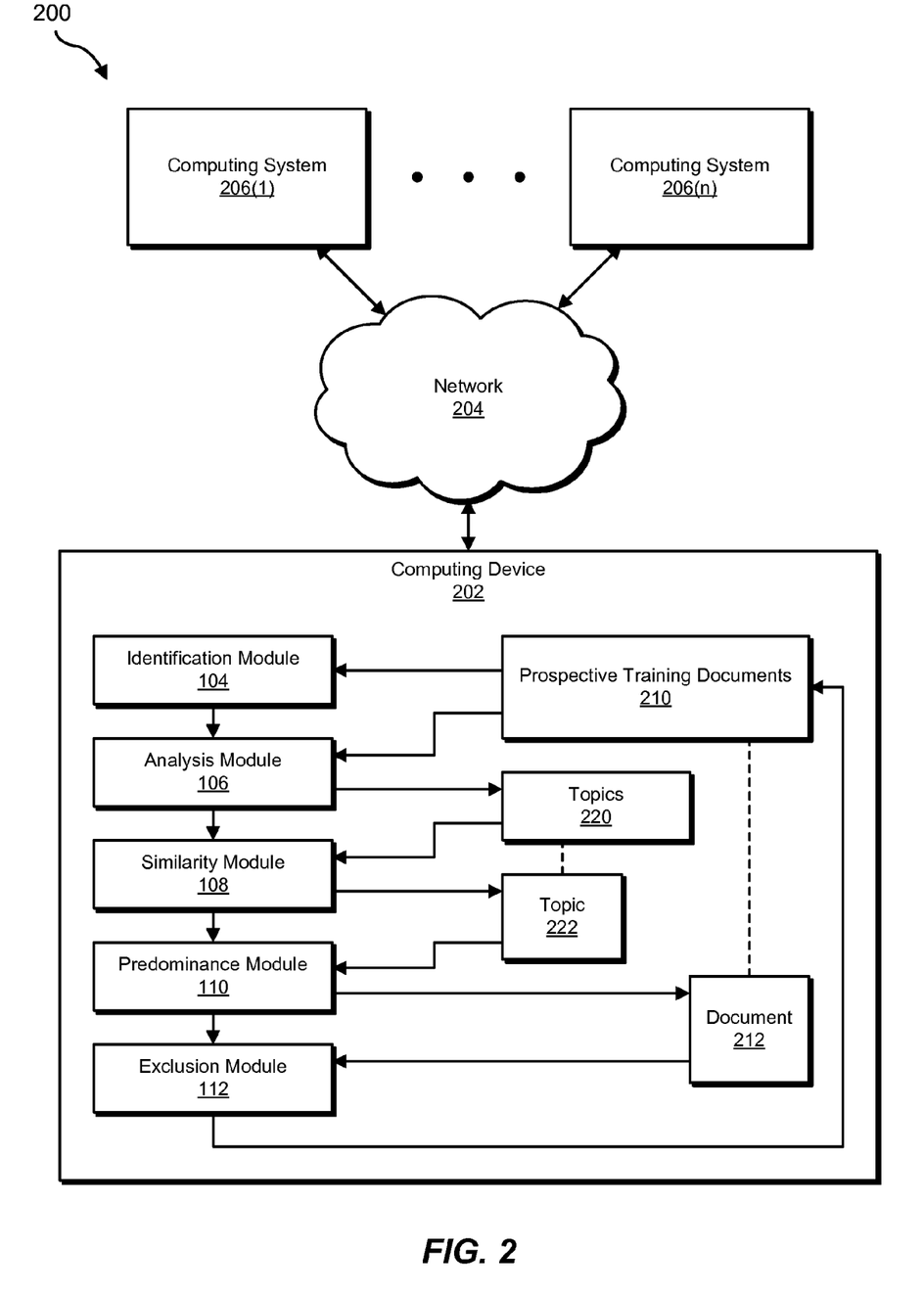
FIG. 2 is a block diagram of an exemplary system for classifying documents for data loss prevention.
Figure 4:
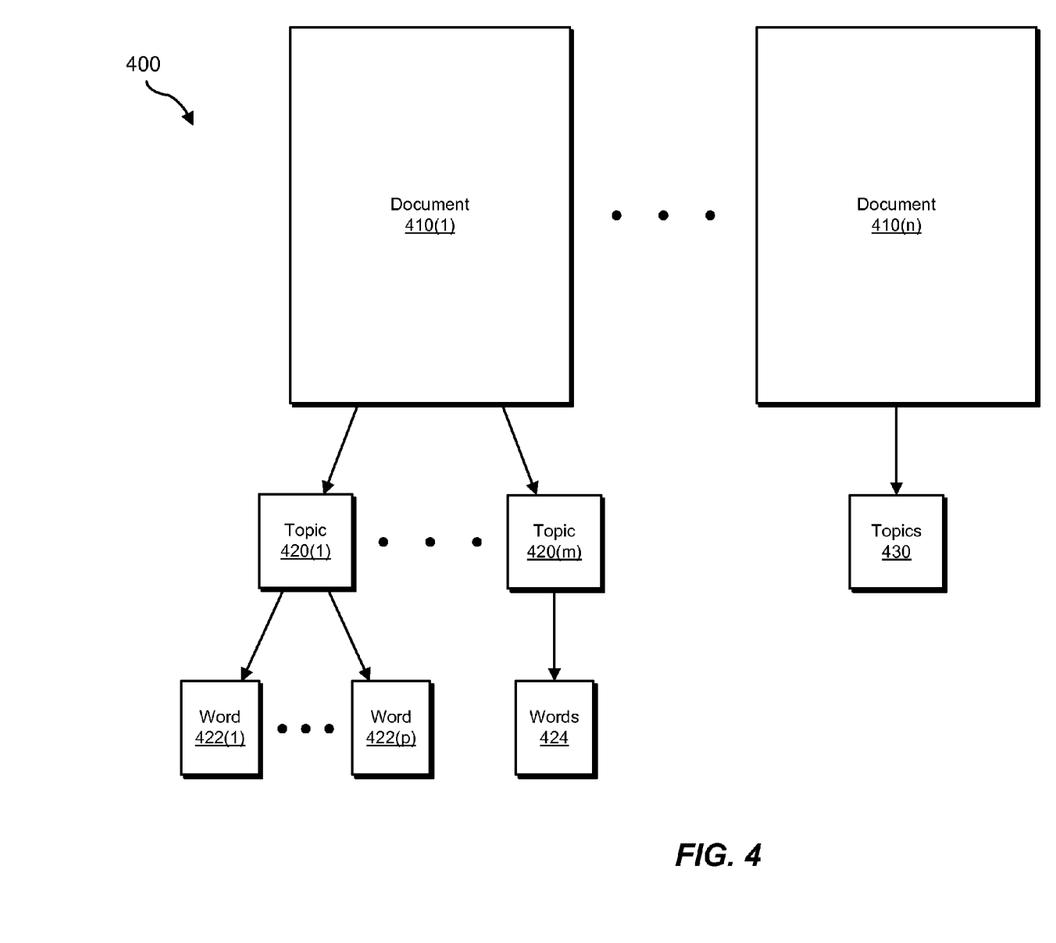
FIG. 4 is an illustration of an exemplary corpus for classifying documents for data loss prevention.
Figure 5:
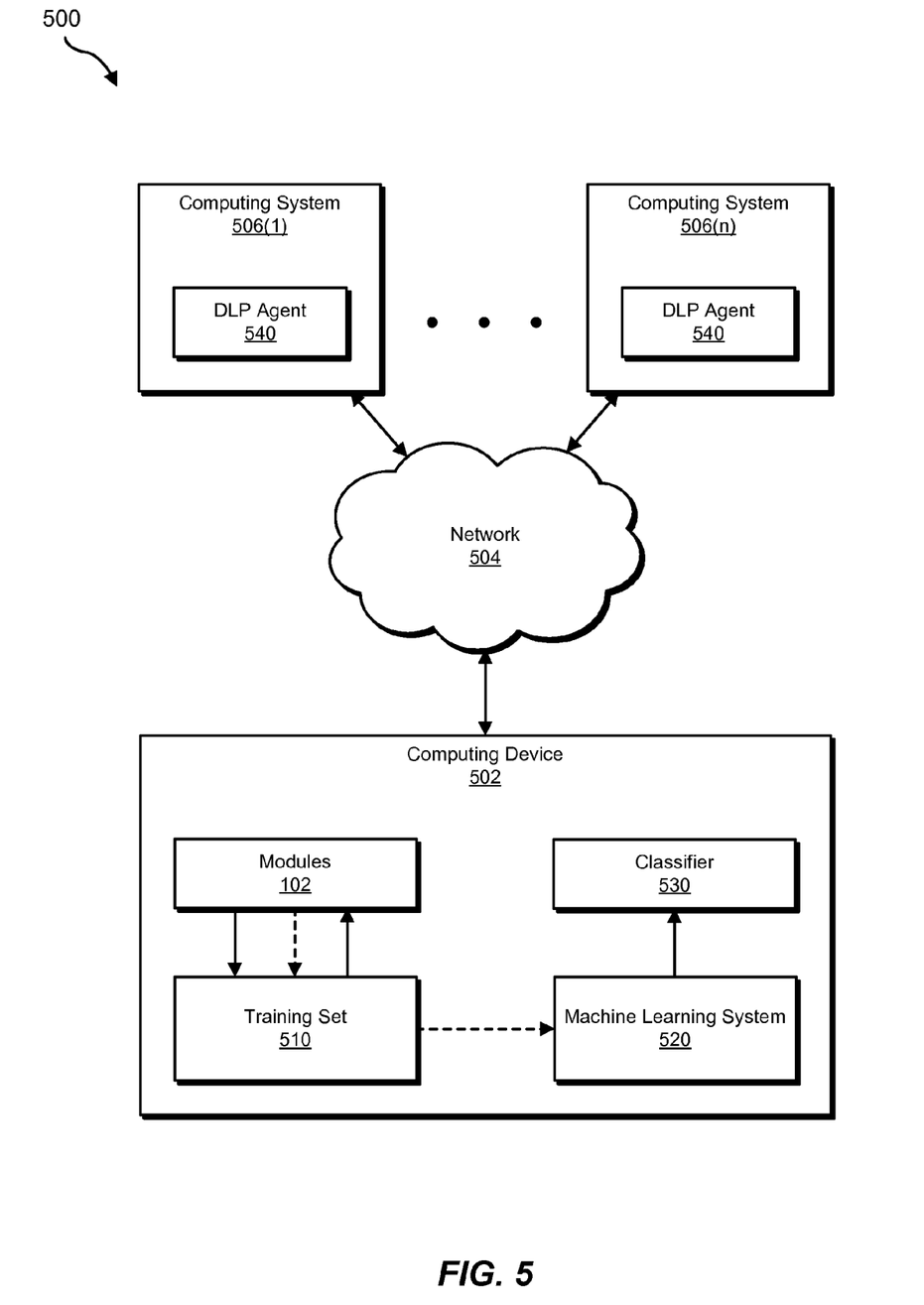
FIG. 5 is a block diagram of an exemplary system for classifying documents for data loss prevention.

The following will provide, with reference to FIGS. 1, 2, and 5, detailed descriptions of exemplary systems for classifying documents for data loss prevention. Detailed descriptions of corresponding computer-implemented methods will also be provided in connection with FIG. 3. Detailed descriptions of an exemplary corpus will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for classifying documents for data loss prevention. As illustrated in this figure, exemplary system 100 may include one or more modules 102 for performing one or more tasks. For example, and as will be explained in greater detail below, exemplary system 100 may include an identification module 104 programmed to identify a set of prospective training documents for a machine learning classifier that is configured to provide input for data loss prevention determinations. Exemplary system 100 may also include an analysis module 106 programmed to perform a semantic analysis on the set of prospective training documents to identify a plurality of topics within the set of prospective training documents. Exemplary system 100 may further include a similarity module 108 programmed to apply a similarity metric to the plurality of topics to identify at least one unrelated topic within the plurality of topics with a similarity to the other topics within the plurality of topics, as determined by the similarity metric, that falls below a predetermined similarity threshold.

In addition, and as will be described in greater detail below, exemplary system 100 may include a predominance module 110 programmed to identify, based at least in part on the semantic analysis, at least one irrelevant prospective training document within the set of prospective training documents in which a predominance of the unrelated topic is above a predetermined predominance threshold. Exemplary system 100 may also include an exclusion module 112 programmed to exclude the irrelevant prospective training document from the set of prospective training documents based at least in part on the predominance of the unrelated topic within the irrelevant prospective training document. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing systems 206(1)-(n)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with computing systems 206(1)-(n) via a network 204. For example, computing device 202 may be configure to provide one or more data loss prevention services to computing systems 206(1)-(n) on network 204.

In one embodiment, identification module 104, analysis module 106, similarity module 108, predominance module 110, and/or exclusion module 112 from FIG. 1 may, when executed by at least one processor of computing device 202, facilitate computing device 202 in classifying documents for data loss prevention. For example, and as will be described in greater detail below, one or more of modules 102 may cause computing device 202 to 1) identify prospective training documents 210 for a machine learning classifier that is configured to provide input for data loss prevention determinations (e.g., for computing systems 206(1)-(n) and/or network 204), 2) perform a semantic analysis on prospective training documents 210 to identify topics 220 within prospective training documents 210, 3) apply a similarity metric to topics 220 to identify an unrelated topic 222 within topics 220 with a similarity to the other topics within topics 220, as determined by the similarity metric, that falls below a predetermined similarity threshold, 4) identify, based at least in part on the semantic analysis, at least one irrelevant document 212 within prospective training documents 210 in which a predominance of topic 222 is above a predetermined predominance threshold, and 5) exclude document 212 from prospective training documents 210 based at least in part on the predominance of topic 222 within document 212.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device. For example, computing device 202 may represent a data loss prevention management server.

Computing systems 206(1)-(n) generally represent any type or form of computing device capable of reading computer-executable instructions. Examples of computing systems 206(1)-(n) include, without limitation, laptops, desktops, servers, cellular phones, personal digital assistants (PDAs), multimedia players, embedded systems, combinations of one or more of the same, exemplary computing system 610 in FIG. 6, or any other suitable computing device. In some examples, computing systems 206(1)-(n) may represent computing devices subject to one or more data loss prevention policies.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
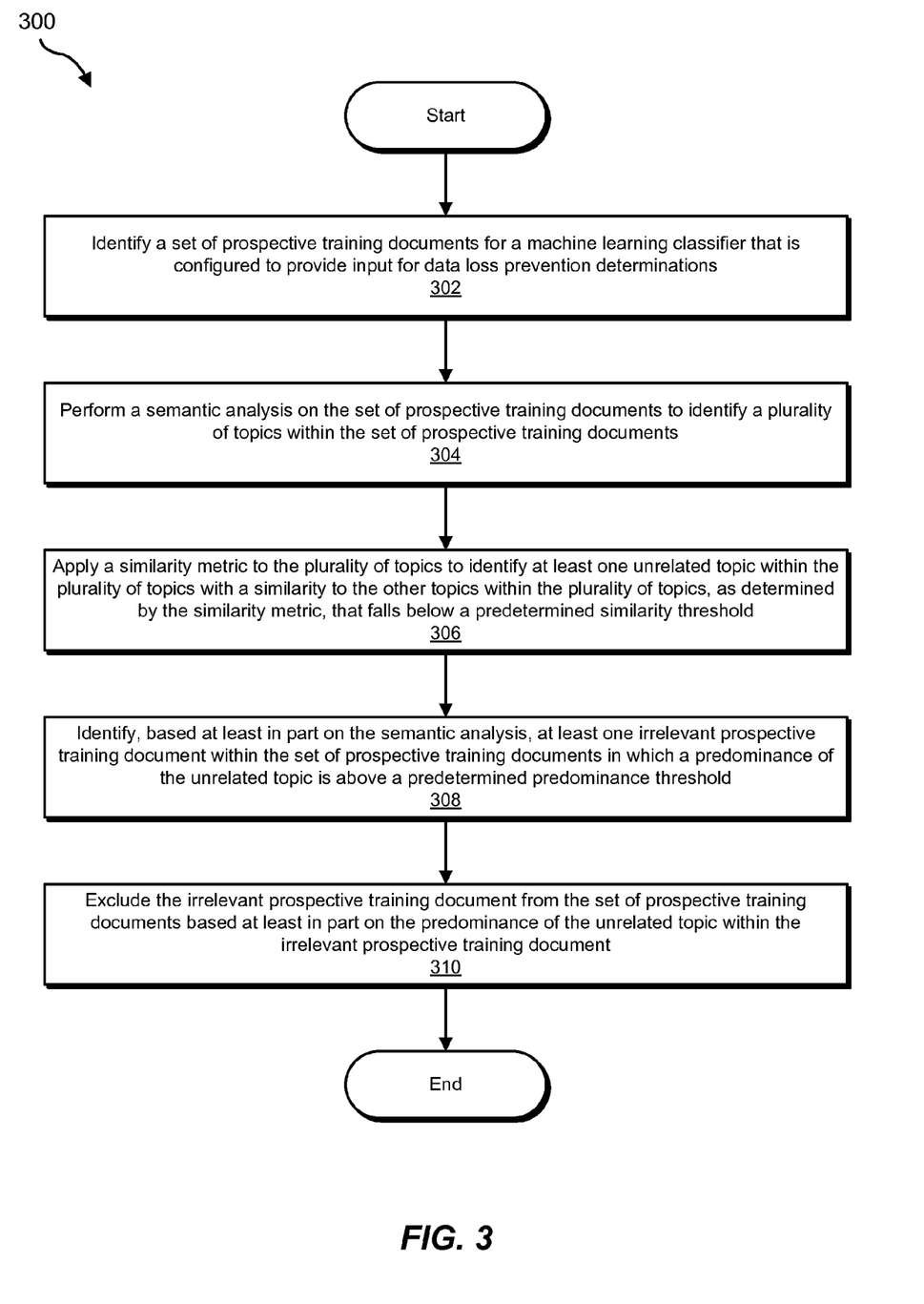
FIG. 3 is a flow diagram of an exemplary method for classifying documents for data loss prevention.

FIG. 3 is a flow diagram of an exemplary computer-implemented method 300 for classifying documents for data loss prevention. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a set of prospective training documents for a machine learning classifier that is configured to provide input for data loss prevention determinations. For example, at step 302 identification module 104 may, as part of computing device 202 in FIG. 2, identify prospective training documents 210 for a machine learning classifier that is configured to provide input for data loss prevention determinations (e.g., for computing systems 206(1)-(n) and/or network 204).

As used herein, the phrase "machine learning" may refer to any technique for computer-enabled empirical assessments. For example, the phrase "machine learning" may refer to one or more supervised learning techniques for analyzing future inputs based on an analysis of training data. As used herein, the term "classifier" may refer to any algorithm, formula, rule, module, and/or filter for classifying, labeling, categorizing, rating, and/or scoring an input. Accordingly, the phrase "machine learning classifier" may refer to any classifier generated, defined, and/or configured at least in part by a machine learning technique.

As used herein, the term "document" may refer to any data object that may be of interest in a data loss prevention determination. For example, a document may include a file, an email, etc. Additionally or alternatively, a document may include the textual content of a data object (e.g., the plain text contents of a word processing document, an email, etc.). As used herein, the phrase "training document" may refer to any input to a machine learning system to contribute to the generation, definition, and/or configuration of a machine learning classifier. For example, a machine learning system may take a training document and a classification of the training document as input with the object of generating a classifier that provides the same classification to like documents.

In some examples, the set of prospective training documents may include a corpus of documents considered to have one or more characteristics relevant to at least one data loss prevention policy. For example, the set of prospective training documents may include a corpus of documents regarded as sensitive and/or confidential (e.g., a "positive set"). Accordingly, the machine learning classifier may be configured to provide input for data loss prevention determinations to identify sensitive and/or confidential documents.

As used herein, the phrase "data loss prevention" may refer to a technique for protecting sensitive information by applying one or more policies, rules, and/or heuristics to data within the bounds of a data loss prevention system to determine the disposition of the data in various scenarios. In some examples, a data loss prevention system may be configured to prevent sensitive information from leaking (e.g., being transmitted outside the bounds of the system under uncontrolled circumstances). Additionally or alternatively, a data loss prevention system may be configured to prevent sensitive information from being misused and/or insecurely stored.

Identification module 104 may identify the set of prospective training documents in any of a variety of ways. For example, identification module 104 may identify a user-defined list of documents. Additionally or alternatively, identification module 104 may identify all documents in a user-specified location (e.g., all documents on a specified server) and/or with a user-specified characteristic (e.g., all documents owned by a specified user). In some examples, identification module 104 may simply receive the set of prospective training documents as input.

FIG. 4 illustrates an exemplary corpus 400. As shown in FIG. 4, exemplary corpus 400 may include documents 410 (1)-(n). Using FIG. 4 as an example, at step 302 identification module 104 may identify documents 410(1)-(n).

FIG. 5 illustrates an exemplary system 500 for classifying documents for data loss prevention. As shown in FIG. 5, exemplary system 500 may include a computing device 502 in communication with computing systems 506(1)-(n) via a network 504. Using FIG. 5 as an example, at step 302 identification module 104 may, as a part of computing device 502, identify a training set 510.

Returning to FIG. 3, at step 304 one or more of the systems described herein may perform a semantic analysis on the set of prospective training documents to identify a plurality of topics within the set of prospective training documents. For example, at step 304 analysis module 106 may, as part of computing device 202 in FIG. 2, perform a semantic analysis on prospective training documents 210 to identify topics 220 within prospective training documents 210.

As used herein, the phrase "semantic analysis" may refer to any technique for identifying topics within, extracting topics from, and/or attributing topics to a corpus of documents. As used herein, the term "topic" may refer to any latent semantic element (e.g., a concept, subject matter, etc.) represented within and/or used to generate a document. For example, the semantic analysis may include a latent Dirichlet allocation applied to the set of prospective training documents. Additionally or alternatively, the semantic analysis may include the use of a different topic model (e.g., probabilistic latent semantic analysis)

As used herein, in some examples the phrase "latent Dirichlet allocation" may refer to an approximation of a latent Dirichlet allocation. For example, analysis module 106 may use any of a variety of approaches to infer a probability distribution of one or more variables defined within the latent Dirichlet allocation model, including, without limitation, Gibbs sampling, variational Bayesian approximation, and/or expectation propagation.

Analysis module 106 may perform the semantic analysis on the set of prospective training documents in any suitable manner. For example, analysis module 106 may use the set of prospective training documents as a corpus in a latent Dirichlet allocation, each prospective training document representing a document within the latent Dirichlet allocation. In some examples, analysis module 106 may also preprocess the prospective training documents (e.g., to extract the text from the prospective training documents in a suitable format).

Using FIG. 4 as an example, at step 304 analysis module 106 may perform a semantic analysis on corpus 400, identifying topics for each of documents 410(1)-(n). As shown in FIG. 4, analysis module 106 may determine that document 410(1) includes topics 420(1)-(m). Likewise, analysis module 106 may determine that document 410(n) includes topics 430. Furthermore, analysis module 106 may identify, for each topic, the words within the documents relating to the topic. For example, analysis module 106 may, in identifying topic 420(1), determine that words 422(1)-(p) in documents 410 (1)-(n) relate to topic 420(1). Likewise, analysis module 106 may, in identifying topic 420(m), determine that words 424 in documents 410(1)-(n) relate to topic 420(m). In some examples, one or more of documents 410(1)-(n) may share one or more topics, and one or more topics identified by analysis module 106 may share one or more words. For example, one of topics 420(1)-(m) may be included in topics 430. Additionally, one or more of words 422(1)-(p) may be included in words 424.

Using FIG. 5 as an example, at step 304 analysis module 106 may perform a semantic analysis on training set 510 to identify a set of topics relating to documents within training set 510.

Returning to FIG. 3, at step 306 one or more of the systems described herein may apply a similarity metric to the plurality of topics to identify at least one unrelated topic within the plurality of topics with a similarity to the other topics within the plurality of topics, as determined by the similarity metric, that falls below a predetermined similarity threshold. For example, at step 306 similarity module 108 may, as part of computing device 202 in FIG. 2, apply a similarity metric to topics 220 to identify unrelated topic 222 within topics 220 with a similarity to the other topics within topics 220, as determined by the similarity metric, that falls below a predetermined similarity threshold.

As used herein, the phrase "similarity metric" may refer to any suitable basis of comparison between two or more topics. For example, the similarity metric may use words in common between topics as a basis for comparison. For example, identifying the unrelated topic may include identifying a list of most common (and/or representative) terms for each topic within the set of topics. In this example, the similarity metric may include the number of overlapping terms between lists of most common terms for respective topics within the set of topics. For example, similarity module 108 may identify the most common 20 words for each topic within the set of topics. Similarity module 108 may then compare the set of 20 selected words for a topic with the set of 20 selected words for each other topic and determine that the 20 selected words of the topic do not overlap with the 20 selected words of any other topic. Similarity module 108 may therefore determine that the topic is unrelated to the other topics (e.g., because the predetermined similarity threshold may require at least one word in common with at least one other topic).

As used herein, the terms "term" and "word" may refer to any suitable lexicographical unit. For example, in various examples the terms "term" and "word" may refer to a word, a term, a lexeme, and/or a lexical item. In examples where the term "word" may refer to a lexeme and/or a lexical item, one or more of the systems described herein may perform a preprocessing step on the set of prospective training documents (e.g., to replace words with lexemes and/or to mark out lexical items to be treated as words in a latent Dirichlet allocation).

Using FIG. 4 as an example, similarity module 108 may determine that topic 420(1) is an unrelated topic because the top 20 words of topic 420(1) (e.g., words 422(1)-(20), assuming that p is greater than 20) do not overlap with the top 20 words of any of topics 420(2)-(m), topics 430, or any topics of documents 420(2)-(n−1).

Returning to FIG. 3, at step 308 one or more of the systems described herein may identify, based at least in part on the semantic analysis, at least one irrelevant prospective training document within the set of prospective training documents in which a predominance of the unrelated topic is above a predetermined predominance threshold. For example, at step 308 predominance module 110 may, as part of computing device 202 in FIG. 2, identify, based at least in part on the semantic analysis, irrelevant document 212 within prospective training documents 210 in which a predominance of topic 222 is above a predetermined predominance threshold.

Predominance module 110 may identify the irrelevant prospective training document in any of a variety of ways. For example, predominance module 110 may compare the unrelated topic to documents within the set of prospective training documents to find a document that includes words largely and/or primarily relating to the topic. For example, the predetermined predominance threshold may equal 60%, such that if 60% of the words in a document are words corresponding to the unrelated topic, predominance module 110 may determine that the document is irrelevant (e.g., not actually a sensitive document subject to data loss prevention policies).

In some examples, predominance module 110 may identify multiple irrelevant documents based on their relation to the unrelated topic. For example, predominance module 110 may identify a subset of prospective training documents within the set of prospective training documents in each of which a corresponding predominance of the unrelated topic is above the predetermined predominance threshold. As will be explained in greater detail below, in some examples one or more of the systems described herein may select the irrelevant prospective training document as representative of the subset and present the irrelevant prospective training document to a user for review (e.g., in order to ensure that the subset represents irrelevant documents).

Returning to FIG. 3, at step 310 one or more of the systems described herein may exclude the irrelevant prospective training document from the set of prospective training documents based at least in part on the predominance of the unrelated topic within the irrelevant prospective training document. For example, at step 310 exclusion module 112 may, as part of computing device 202 in FIG. 2, exclude document 212 from prospective training documents 210 based at least in part on the predominance of topic 222 within document 212.

Exclusion module 112 may exclude the irrelevant prospective training document from the set of prospective training documents in any suitable manner. For example, exclusion module 112 may remove the irrelevant prospective training documents from the set of prospective training documents. Additionally or alternatively, exclusion module 112 may mark the irrelevant prospective training document as unsuitable for training a classifier for data loss prevention.

In some examples, exclusion module 112 may additionally verify that the irrelevant prospective training document is irrelevant before excluding the irrelevant prospective training document from the set of prospective training documents. For example, exclusion module 112 may present the irrelevant prospective training document to a user and then receive input from the user to exclude the irrelevant prospective training document from the set of prospective training documents. Exclusion module 112 may present the irrelevant prospective training document to the user in any of a variety of ways. For example, exclusion module 112 may provide an identifier (e.g., a file name, a title, etc.) of the irrelevant prospective training document. Additionally or alternatively, exclusion module 112 may load and display the entirety of the irrelevant prospective training document. In some examples, exclusion module 112 may present one or more excerpts of the irrelevant prospective training document to show examples of the unrelated topic within the irrelevant prospective training document.

As mentioned earlier, in some examples one or more of the systems described herein may have identified a subset of prospective training documents that are predominated by the unrelated topic (e.g., of which the irrelevant prospective training document is a member). In these examples, exclusion module 112 may select the irrelevant prospective training document as representative of the subset of prospective training documents based at least in part on a representativeness metric applied to the irrelevant prospective training document. For example, exclusion module 112 may identify the irrelevant prospective training document within the subset by determining that the irrelevant prospective training document has the highest average pairwise cosine similarity with all other documents in the subset. Accordingly, if exclusion module 112 receives input to exclude the irrelevant prospective training document, exclusion module 112 may likewise exclude the subset of documents which the irrelevant prospective training document represents.

In some examples, exclusion module 112 may additionally perform a cross validation of the set of prospective training documents with the subset of prospective training documents included and without the subset of prospective training documents included to demonstrate the potential impact of including the subset of prospective training documents. If exclusion module 112 receives input that the impact of including the subset is tolerable, exclusion module 112 may temporarily remove the subset of prospective training documents (as will be described in greater detail below, in some examples the systems described herein may iterate one or more of the methods described herein multiple times to further refine the set of prospective training documents) and add the subset of prospective training documents again once the set of prospective training documents is ready for training a classifier.

While exclusion module 112 may exclude the irrelevant prospective training document from the set of prospective training documents, in some examples exclusion module 112 may use the irrelevant prospective training document for another data loss prevention purpose. For example, exclusion module 112 may add a fingerprint of the irrelevant prospective training document to a list of potentially sensitive documents for data loss prevention determinations. In some examples, exclusion module 112 may present the option to exclude the irrelevant prospective training document from the set of prospective training documents but to include the fingerprint of the irrelevant prospective training document in a data loss prevention fingerprint database to a user. As used herein, the term "fingerprint" may refer to any fingerprint, hash, signature, and/or other unique and/or probably unique identifier of a document. In another example, exclusion module 112 may perform a keyword extraction on the irrelevant prospective training document for use in data loss prevention determinations. In this example, exclusion module 112 may present the option to exclude the irrelevant prospective training document and perform the keyword extraction to a user.

As mentioned earlier, in some examples one or more of the systems described herein may iterate one or more of the methods multiple times to continue refining the set of prospective training documents. For example, after excluding the irrelevant prospective training document (and, e.g., the subset of documents that the irrelevant prospective training document may represent), exclusion module 112 may return the edited set of prospective training documents to identification module 104 such that the systems and methods described herein may identify one or more additional unrelated topics. For example, one or more of the systems described herein may 1) apply the similarity metric to identify an additional unrelated topic within the plurality of topics, 2) identify an additional irrelevant prospective training document based at least in part on the additional unrelated topic, and 3) exclude the additional irrelevant prospective training document from the set of prospective training documents. In some examples, the systems and methods described herein may iterate the process described above until no more unrelated topics are found. Using FIG. 5 as an example, modules 102 may exclude documents from training set 510 based on finding one or more unrelated topics, and then use training set 510 as modified as input to identify more unrelated topics and exclude more documents.

In some examples, after excluding the irrelevant prospective training document from the set of prospective training documents, exclusion module 112 may train the machine learning classifier with the set of prospective training documents. For example, after the systems described herein have performed multiple iterations of refining the set of prospective training documents, these systems may determine that the set of prospective training documents includes no more unrelated topics, and, therefore, no more irrelevant documents. Using FIG. 5 as an example, exclusion module 112 may provide training set 510 to a machine learning system 520 to generate a classifier 530 based on training set 510 as modified by modules 102.

Additionally, in some examples one or more of the systems described herein may perform a data loss prevention analysis on a sensitive document based at least in part on the machine learning classifier. For example, these systems may identify a suspect document in motion (e.g., by intercepting an attempt by a user to email a document outside a protected network) and apply the machine learning classifier to the suspect document to determine that the suspect document contains sensitive information. The data loss prevention analysis may include any of a variety of additional inputs in combination with the machine learning classifier. For example, the data loss prevention analysis may include contextual information (e.g., document metadata, information about a user, etc.) in the data loss prevention analysis. These systems may then perform a data loss prevention action on the sensitive document based on the data loss prevention analysis. The data loss prevention action may include any of a variety of actions, including blocking an attempt to transmit the document, redacting a transmission of the document, warning an administrator, warning a user, etc. Using FIG. 5 as an example, DLP agent 540 on computing systems 506(1)-(n) may use classifier 530 to perform data loss prevention analyses. For example, DLP agent 540 may communicate with computing device 502 to classify documents using classifier 530. Additionally or alternatively, computing device 502 may distribute classifier 530 to computing systems 506(1)-(n) for use by DLP agent 540.

As explained above, by performing semantic analyses (e.g., a latent Dirichlet allocation) on prospective training sets of sensitive documents to exclude irrelevant documents from the prospective training sets before training machine learning classifiers with the prospective training sets, the systems and methods described herein may facilitate efficient and accurate data loss prevention via machine learning classification. Additionally, in some examples, by presenting representative documents of apparently irrelevant documents to an administrator, these systems and methods may further ensure the quality of input to machine learning classifiers, thereby potentially reducing false negatives and/or false positives in data loss prevention determinations.

Figure 6:
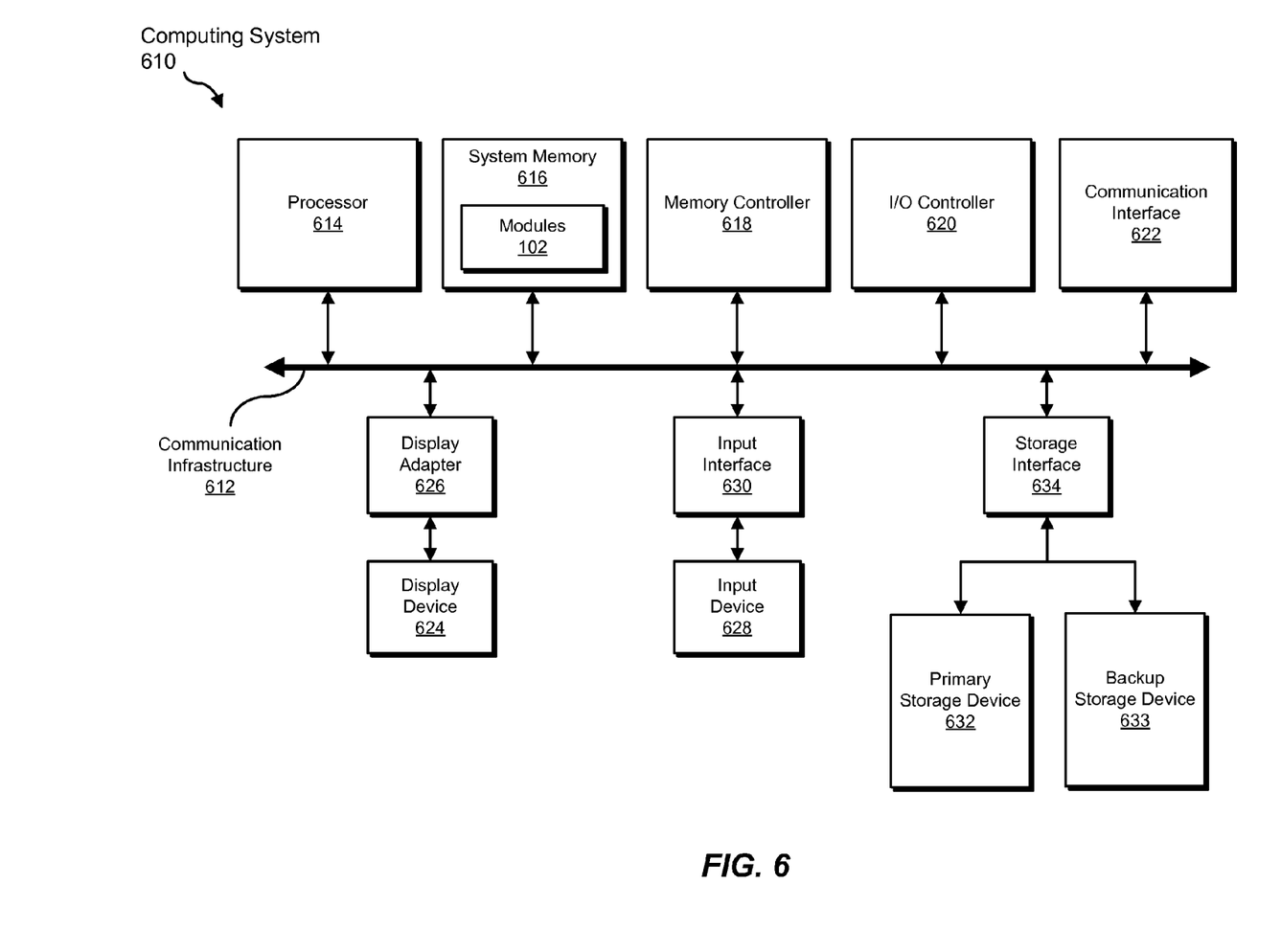
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, performing, applying, excluding, presenting, receiving, selecting, and adding steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
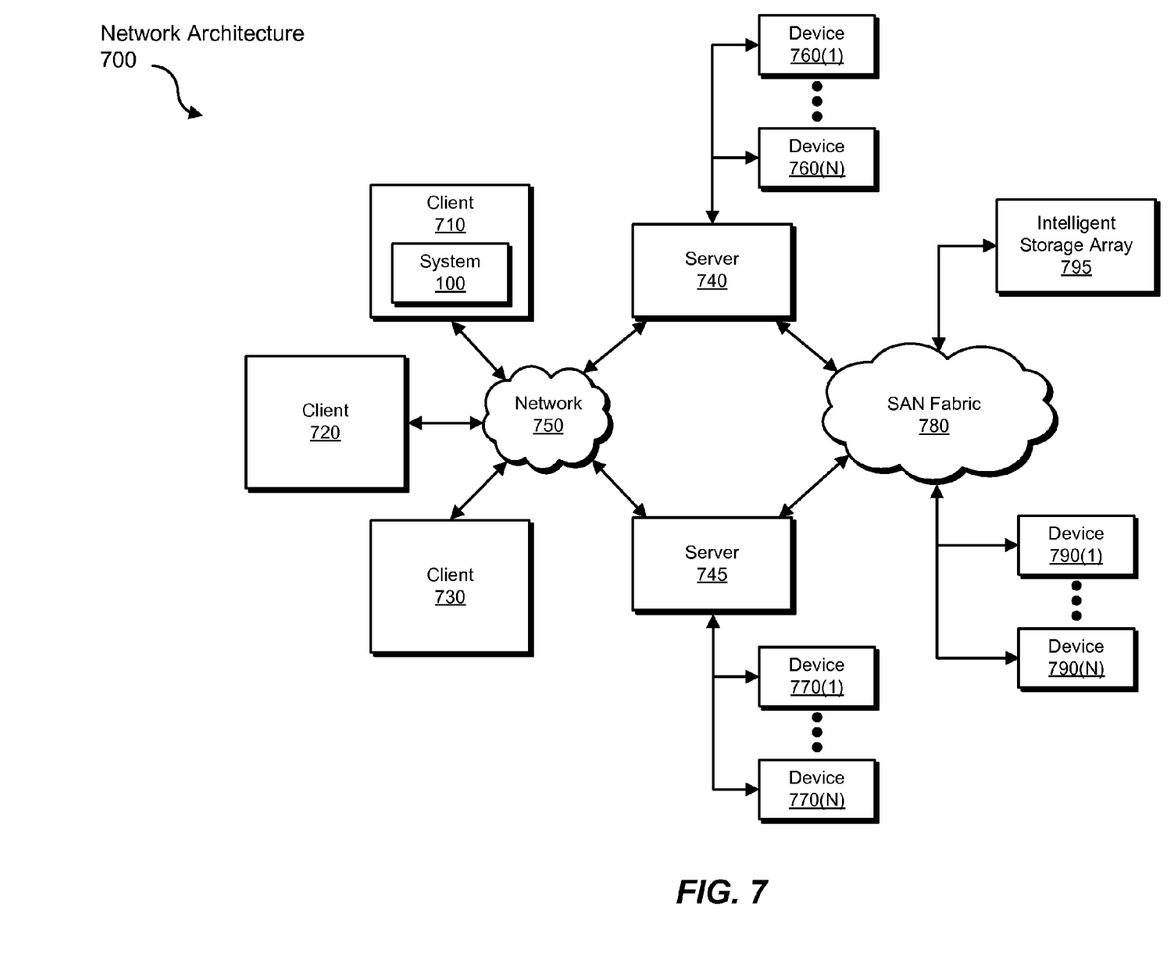
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, performing, applying, excluding, presenting, receiving, selecting, and adding steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for classifying documents for data loss prevention.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for refining data loss prevention training sets. As another example, one or more of the modules recited herein may transform a computing system into a data-loss-prevention document classifier. As an additional example, one or more of the modules recited herein may transform a set of training documents into a classifier. As another example, one or more of the modules described herein may transform an over-inclusive set of training documents into a refined set of training documents.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for classifying documents for data loss prevention, at least a portion of the method being performed by a computing device comprising at least one processor, the method comprising:
   identifying a set of prospective training documents for a machine learning classifier that is configured to provide input for data loss prevention determinations, the set of prospective training documents comprising documents regarded as sensitive;
   performing a semantic analysis on the set of prospective training documents to identify a plurality of topics within the set of prospective training documents;
   applying a similarity metric to the plurality of topics to identify at least one unrelated topic within the plurality of topics with a similarity to the other topics within the plurality of topics, as determined by the similarity metric, that falls below a predetermined similarity threshold, and to thereby determine that the unrelated topic is unrelated to the other topics within the plurality of topics;
   identifying, based at least in part on the semantic analysis, at least one irrelevant prospective training document within the set of prospective training documents in which a predominance of the unrelated topic is above a predetermined predominance threshold by determining the predominance of the unrelated topic by the presence of the unrelated topic within the irrelevant prospective training document as identified in the semantic analysis and not by the presence within the irrelevant prospective training document of any related topic within the plurality of topics;
   excluding the irrelevant prospective training document from the set of prospective training documents based at least in part on the predominance of the unrelated topic within the irrelevant prospective training document.

2. The computer-implemented method of claim 1, wherein the semantic analysis comprises a latent Dirichlet allocation applied to the set of prospective training documents.

3. The computer-implemented method of claim 1, wherein excluding the irrelevant prospective training document further comprises:
   presenting the irrelevant prospective training document to a user;
   receiving input from the user to exclude the irrelevant prospective training document from the set of prospective training documents.

4. The computer-implemented method of claim 3, wherein:
   identifying the irrelevant prospective training document comprises identifying a subset of prospective training documents within the set of prospective training documents in each of which a corresponding predominance of the unrelated topic is above the predetermined predominance threshold;
   presenting the irrelevant prospective training document to the user comprises selecting the irrelevant prospective training document as representative of the subset of prospective training documents based at least in part on a representativeness metric applied to the irrelevant prospective training document.

5. The computer-implemented method of claim 1, wherein:
   identifying the unrelated topic comprises identifying a list of most common terms for each topic within the set of topics;
   the similarity metric comprises a number of overlapping terms between lists of most common terms for respective topics within the set of topics.

6. The computer-implemented method of claim 1, further comprising adding a fingerprint of the irrelevant prospective training document to a list of potentially sensitive documents for data loss prevention determinations.

7. The computer-implemented method of claim 1, further comprising performing a keyword extraction on the irrelevant prospective training document for use in data loss prevention determinations.

8. The computer-implemented method of claim 1, further comprising:
   applying the similarity metric to identify an additional unrelated topic within the plurality of topics;
   identifying an additional irrelevant prospective training document based at least in part on the additional unrelated topic;
   excluding the additional irrelevant prospective training document from the set of prospective training documents.

9. The computer-implemented method of claim 1, further comprising, after excluding the irrelevant prospective training document from the set of prospective training documents, training the machine learning classifier with the set of prospective training documents.

10. The computer-implemented method of claim 9, further comprising:
    performing a data loss prevention analysis on a sensitive document based at least in part on the machine learning classifier;
    performing a data loss prevention action on the sensitive document based on the data loss prevention analysis.

11. A system for classifying documents for data loss prevention, the system comprising:
    an identification module programmed to identify a set of prospective training documents for a machine learning classifier that is configured to provide input for data loss prevention determinations, the set of prospective training documents comprising documents regarded as sensitive;
    an analysis module programmed to perform a semantic analysis on the set of prospective training documents to identify a plurality of topics within the set of prospective training documents;
    a similarity module programmed to apply a similarity metric to the plurality of topics to identify at least one unrelated topic within the plurality of topics with a similarity to the other topics within the plurality of topics, as determined by the similarity metric, that falls below a predetermined similarity threshold, and to thereby determine that the unrelated topic is unrelated to the other topics within the plurality of topics;
    a predominance module programmed to identify, based at least in part on the semantic analysis, at least one irrelevant prospective training document within the set of prospective training documents in which a predominance of the unrelated topic is above a predetermined predominance threshold by determining the predominance of the unrelated topic by the presence of the unrelated topic within the irrelevant prospective training document as identified in the semantic analysis and not by the presence within the irrelevant prospective training document of any related topic within the plurality of topics;

an exclusion module programmed to exclude the irrelevant prospective training document from the set of prospective training documents based at least in part on the predominance of the unrelated topic within the irrelevant prospective training document;

at least one processor configured to execute the identification module, the analysis module, the similarity module, the predominance module, and the exclusion module.

12. The system of claim 11, wherein the semantic analysis comprises a latent Dirichlet allocation applied to the set of prospective training documents.

13. The system of claim 11, wherein the exclusion module is further programmed to exclude the irrelevant prospective training document by:

presenting the irrelevant prospective training document to a user;

receiving input from the user to exclude the irrelevant prospective training document from the set of prospective training documents.

14. The system of claim 13, wherein:

the predominance module is programmed to identify the irrelevant prospective training document by identifying a subset of prospective training documents within the set of prospective training documents in each of which a corresponding predominance of the unrelated topic is above the predetermined predominance threshold;

the exclusion module is programmed to present the irrelevant prospective training document to the user by selecting the irrelevant prospective training document as representative of the subset of prospective training documents based at least in part on a representativeness metric applied to the irrelevant prospective training document.

15. The system of claim 11, wherein:

the similarity module is programmed to identify the unrelated topic by identifying a list of most common terms for each topic within the set of topics;

the similarity metric comprises a number of overlapping terms between lists of most common terms for respective topics within the set of topics.

16. The system of claim 11, wherein the exclusion module is further programmed to add a fingerprint of the irrelevant prospective training document to a list of potentially sensitive documents for data loss prevention determinations.

17. The system of claim 11, wherein the exclusion module is further programmed to perform a keyword extraction on the irrelevant prospective training document for use in data loss prevention determinations.

18. The system of claim 11, wherein:

the similarity module is further programmed to apply the similarity metric to identify an additional unrelated topic within the plurality of topics;

the predominance module is further programmed to identify an additional irrelevant prospective training document based at least in part on the additional unrelated topic;

the exclusion module is further programmed to exclude the additional irrelevant prospective training document from the set of prospective training documents.

19. The system of claim 11, wherein the exclusion module is further programmed to, after excluding the irrelevant prospective training document from the set of prospective training documents, train the machine learning classifier with the set of prospective training documents.

20. A non-transitory computer-readable-storage medium comprising one or more computer-executable instructions that, when executed by at least one processor of a computing device, cause the computing device to:

identify a set of prospective training documents for a machine learning classifier that is configured to provide input for data loss prevention determinations, the set of prospective training documents comprising documents regarded as sensitive;

perform a semantic analysis on the set of prospective training documents to identify a plurality of topics within the set of prospective training documents;

apply a similarity metric to the plurality of topics to identify at least one unrelated topic within the plurality of topics with a similarity to the other topics within the plurality of topics, as determined by the similarity metric, that falls below a predetermined similarity threshold, and to thereby determine that the unrelated topic is unrelated to the other topics within the plurality of topics;

identify, based at least in part on the semantic analysis, at least one irrelevant prospective training document within the set of prospective training documents in which a predominance of the unrelated topic is above a predetermined predominance threshold by determining the predominance of the unrelated topic by the presence of the unrelated topic within the irrelevant prospective training document as identified in the semantic analysis and not by the presence within the irrelevant prospective training document of any related topic within the plurality of topics;

exclude the irrelevant prospective training document from the set of prospective training documents based at least in part on the predominance of the unrelated topic within the irrelevant prospective training document.

* * * * *